June 30, 1931. O. F. CARPENTER 1,812,684
FEEDING AND DRINKING ATTACHMENT FOR BROODERS
Filed April 1, 1930
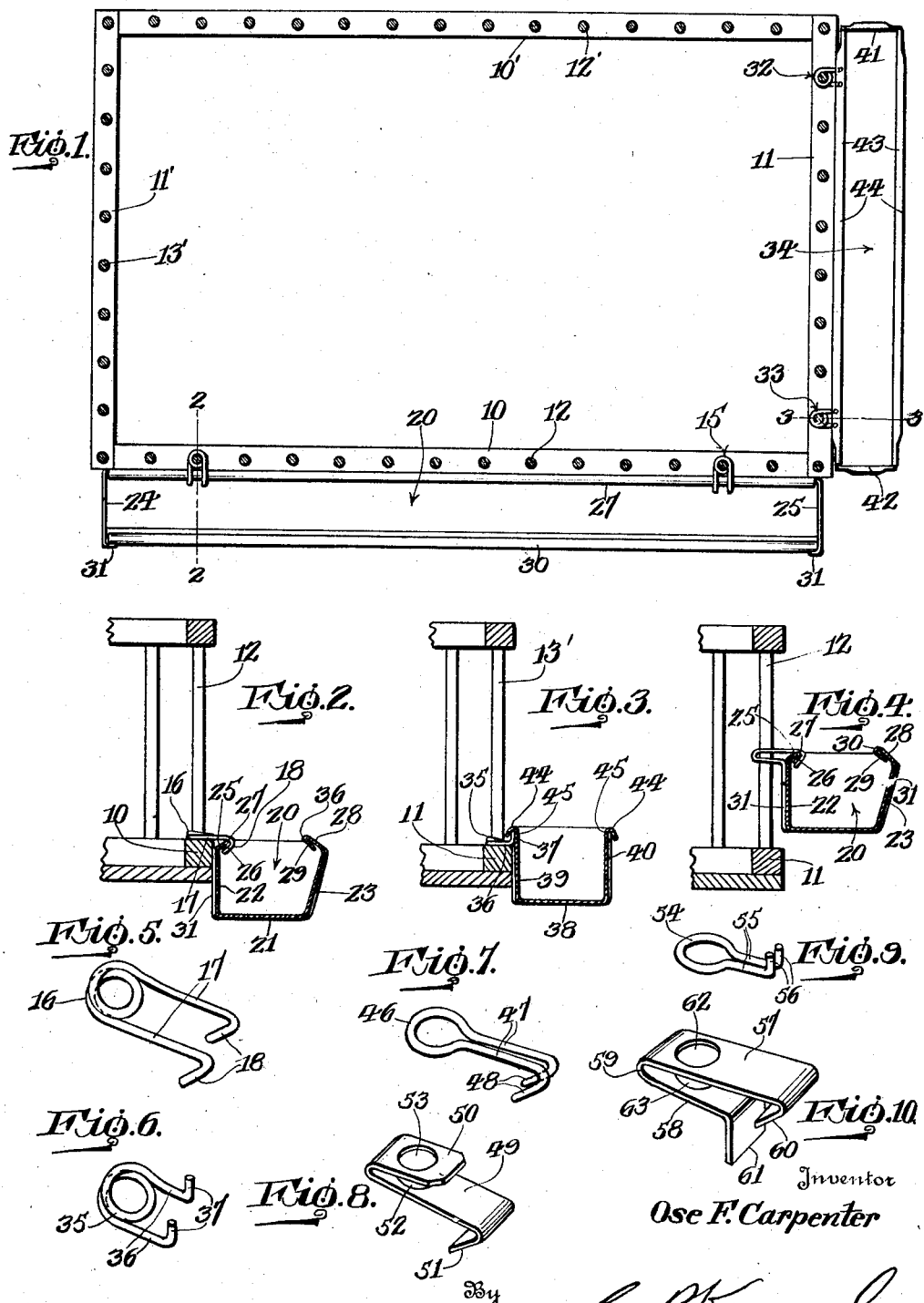
Inventor
Ose F. Carpenter
By Geo. P. Kimmel
Attorney Patented June 30, 1931

1,812,684

UNITED STATES PATENT OFFICE

OSE F. CARPENTER, OF BRIGHTWOOD, VIRGINIA

FEEDING AND DRINKING ATTACHMENT FOR BROODERS

Application filed April 1, 1930. Serial No. 440,786.

This invention relates to a feeding and drinking attachment for brooders, and although designed primarily for use with chick brooders, yet it is to be understood that an attachment, in accordance with this invention may be employed in any connection for which it is found applicable, and the invention has for its object to provide, in a manner as hereinafter set forth, an attachment of the character referred to including means for maintaining it in laterally projected relation with respect to the front or an end of the brooder and disposed in a manner for the chicks to conveniently feed and drink.

A further object of the invention is to provide, in a manner as hereinafter set forth, a feeding and drinking attachment for brooders capable of being vertically adjusted to provide for the convenient feeding and drinking of the chicks as they grow.

A further object of the invention is to provide, in a manner as hereinafter set forth, a feeding and drinking attachment for brooders including a plurality of coupling members and a container member for the feed or water, and with the coupling members detachably engaging with the container member for the purpose of maintaining the latter in projected lateral relation with respect to the front or an end of the brooder and further permitting of the container member being quickly detached from the coupling members when occasion requires.

Further objects of the invention are to provide, in a manner as hereinafter set forth, a feeding and drinking attachment for brooders which is simple in its construction and arrangement, strong, durable, compact, thoroughly efficient in its use, readily installed with respect to the front or end of a brooder, quickly assembled and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:—

Figure 1 is a sectional plan of a brooder coop showing the same provided at its front and at one end with a feeding or drinking attachment in accordance with this invention.

Figure 2 is a section on line 2—2, Figure 1.

Figure 3 is a section on line 3—3, Figure 1.

Figure 4 is a fragmentary view in vertical section of the brooder coop showing in vertical section an adjusted container, pan or trough in accordance with this invention for feeding or drinking purposes.

Figure 5 is a perspective view of the coupling member employed in connection with the container, pan or trough shown in Figure 2.

Figure 6 is a perspective view of the coupling member employed in connection with the form of container, pan or trough shown in Figure 3.

Figures 7, 8, 9 and 10 are perspective views of modified forms of coupling members.

Each of the forms of a feeding and drinking attachment, in accordance with this invention includes a plurality of coupling members and an open top container member, pan or trough for the feed or water. Preferably two coupling members will be employed, but this number can be increased if desired. The container member may be of any desirable length, but not greater than a wall of the brooder. As illustrated by way of example, the container member is of the same length as the wall. The attachment is slidably connected to and vertically adjustable with respect to that of the brooder with which it is connected. Two attachments will be employed, one slidably coupled to the front wall and the other slidably coupled to an end wall. The one at the front wall will contain feed and the one at the end wall will contain water, or vice versa, or both containing feed or water. The container members when coupled with the walls of the brooder will be disposed in laterally projected relation with respect thereto.

In Figure 1 the walls of the brooder are illustrated as of the slatted type and indicated at 10, 10', 11 and 11'. The walls 10 and 10' include a series of spaced slats 12, 12' respectively. The walls 11, 11' include a series of spaced slats 13, 13'. The slats of each wall are vertically disposed and preferably spaced equi-distant from each other.

The feeding and drinking attachment as shown in Figure 1 connected to wall 10 includes a pair of coupling members 14, 15 for slidably mounting upon a pair of slats 12. As each coupling member is of like construction, but one will be described as the description of one will apply to the other. Each coupling member includes a skeleton body portion 16 of circular form having projecting outwardly from the sides thereof a pair of substantially parallel arms 17 of the desired length. The arms 17 are arranged in spaced relation. Each arm 17 has its outer end terminate into a depending, curved hook 18. The arms 17 are of a length to project a substantial distance beyond the bottom of that wall to which the coupling members are slidably connected.

The attachment shown in Figures 1, 2 and 4 further includes an open top container member, pan or trough referred to generally at 20 and which consists of a bottom 21, a rear wall 22, a front wall 23 and a pair of end walls 24, 25. The rear wall 22 is vertically disposed and is of slightly less height than the front wall 23. The rear wall 22 at its top is formed with a forwardly directed, upwardly inclined portion 25 which is bent rearwardly against its lower face as at 26 and the bend 27 provided by bending the portion 25 upon itself is rounded. The bend 27 is positioned below the top edges of the end walls 24, 25.

The front wall 23 inclines forwardly from the bottom 21 and has its upper portion extended rearwardly at an upward inclination as at 28 and bent upon itself as at 29 to provide a rounded bend 30. The bends 27 and 30 form the walls 22, 23 with rounded top edges. The forwardly extending portion of the rear wall 22 is of less width than the rearwardly extending portion of the front wall 23. The bend 30 is positioned above the top edges of the end walls 24, 25. The end walls 24, 25 gradually increase in width from the bottom 21 to the open top of the container 20. The end walls 24, 25 overlap the rear face of the rear wall 22 and the forward face of the forward wall 23 and are suitably connected therewith as indicated at 31. The rearwardly directed, upwardly inclined portion of the front wall 23 is free of connection with the end walls 24, 25. The forwardly extending, upwardly inclined portion of the rear wall 22 is free of connection with the end walls 24, 25. The container 20 is suspended with respect to the wall 10, by the coupling members engaging over the portion 25 of wall 22 or portion 28 of wall 23. Preferably the coupling members are to engage over portion 25 and are so shown.

The container 20 initially is positioned against the bottom of the wall 10 and detachably connected with the latter by the coupling members 14, 15. The container member 20 can contain a body of feed or water and when in its initial position, as shown in Figure 2, the rear wall 22 of the container member abuts against the bottom of the wall 10 thereby preventing any waste of feed. When the chicks grow the container member 20 is elevated and is maintained in such position, as well as in laterally projected position with respect to and abuts the slats of the wall 10, by the coupling members. The inturned portions of the rear wall 22 and front wall 23 of the container member 20 prevent the spilling of the feed or water from the container member 20. The diameter of the body portion 16 of each coupling member is such as to provide for a sliding fit on the slat upon which the coupling member is mounted. When the container member 20 is positioned above the bottom of the wall 10 the slats 12 coact with the rear wall 22 to maintain the member 20 in laterally projected position.

The feeding and drinking attachment which is positioned relative to the end wall 11 is arranged in a like manner as the attachment positioned relative to the front wall 10, that is to say, the coupling members of the end attachment are slidably mounted on a pair of slats 13 of the end wall 11 and project a substantial distance from the latter for the purpose of holding the container member of the end attachment in laterally projected relation with respect to the end wall 11. The coupling members of the end attachment shown in Figures 1 and 3 are generally indicated at 32, 33 and the container member of such attachment at 34. As the coupling members 32, 33 are of like construction, but one will be described as the description of one will apply to the other. Each coupling member includes a circular body portion 35 of skeleton form having projecting therefrom a pair of spaced arms 36. Each arm is of a length to project the required distance from the wall 11. The outer end of each arm terminates into a vertically disposed hook 37.

The container member 34 includes a bottom 38, a rear wall 39, a front wall 40 and a pair of end walls 41, 42. The top of the walls 39, 40 of the container member 34 is bent outwardly upon itself as indicated at 43 then pressed outwardly to provide an enlarged rounded top edge portion 44 and a pocket 45. The edge portion 44 is of a length less than the length of the wall and terminates adjacent each end of the wall.

The pockets 45 provided by the overlapping or bent over portions of the walls 39, 40 selectively receive the hooks 37 of the coupling members 32, 33, that is to say, when the rear wall 39 or front wall is positioned against the wall 11. It may be that when positioning the container 34 that the front wall 40 thereof will abut the wall 11 and under such conditions the hooks 37 of the coupling members will engage in the pockets 45 formed at the top of the wall 40. When the container 34 is not positioned above the bottom 46 of the wall 11, the container 34 abuts against such bottom, but when it is positioned above the bottom the container 34 abuts against the slats 13.

The coupling members are termed combined coupling and hook elements. The container members are termed open top pans. The pans are detachably connected to such elements to permit of the convenient removal of the pans when desired. The hooks 18 are positioned within the pans and the hooks 37 against the outer face of the pan.

Figure 7 discloses a modified form of coupling member for container 20, and which includes a split loop part 46, a pair of parallel arms 47 and a depending hook 48, at the outer end of each arm. The parts 46 and 48 function the same as parts 16 and 18 respectively of coupling member 14 or 15.

Figure 8 discloses another modified form of coupling member for use in connection with container 20 and which is formed of a strap of sheet metal consisting of an intermediate portion 49, an upper portion 50 overlapping the latter at its rear and a hook portion 51 depending from the outer end of portion 49. The portion 50 inclines away from portion 49. The portions 49 and 50 are provided with openings 52, 53 respectively for slidably mounting the coupling member on a slat. The walls of openings 52, 53 coact with the slat to retain the coupling member in position. The portions 49 and 50 are shifted toward each other when it is desired to vertically adjust the coupling members. Apertured portions 49 and 50 and portion 51 function the same as parts 16 and 18 of coupling member 14 or 15.

In Figure 9 there is shown a modified form of coupling member for container 34 and which consists of a split loop part 54, a pair of parallel arms 55 and an upstanding, vertically disposed hook 56 at the outer end of each arm 55. The parts 54 and 56 function the same as parts 35, 37 respectively of coupling member 32 or 33.

Another modified form of coupling member for container 20 is shown in Figures 4 and 10, and which is formed from a strap of sheet metal comprising an upper arm 57, a lower arm 58, a bend 59 between arms 57 and 58, a depending, inwardly extending and downwardly inclined hook 60 at the outer end of upper arm 57, a vertically disposed, depending abutment 61 at the outer end of arm 58 and openings 62, 63 in arms 57, 58 respectively. The arm 57 is of greater length than arm 58 and the later is disposed at a downward inclination with respect to arm 57 from bend 59. The apertured arms and hooks 60 function the same as parts 16 and 17 and the hooks of coupling member 14 or 15. When the form of coupling member shown in Figure 10 is used and when container 20 is elevated above the bottom of wall 10, the abutment 61 cooperates with the hooks 60 to maintain the container in laterally projected relation with respect to the wall 10. See Figure 4.

It is thought that the many advantages of a chick feeding and drinking attachment for brooders, in accordance with this invention can be readily understood, and although the preferred embodiment of the invention is as illustrated and described, yet it is to be understood that changes in the details of construction can be had which fall within the scope of the invention as claimed.

What I claim is:

In an adjustable chick feeding device, a feed container having the top portion of one of its walls angularly disposed with respect to the remaining portion of such wall, and one or more horizontally disposed and vertically adjustable container sustaining and coupling members, each having its outer end part angularly disposed with respect to its remaining part, the said angularly disposed part coacting with said angularly disposed portion for suspending said container in feed holding position, and each member having its inner part apertured for connecting it to and providing for the vertical adjustment thereof relative to an anchoring means therefor, the wall of the aperture coacting with the anchoring means for maintaining said member in adjusted position.

In testimony whereof, I affix my signature hereto.

OSE F. CARPENTER.